May 19, 1925.　　　　P. CAMPBELL ET AL　　　　1,538,683
PISTON RING
Filed Aug. 4, 1923
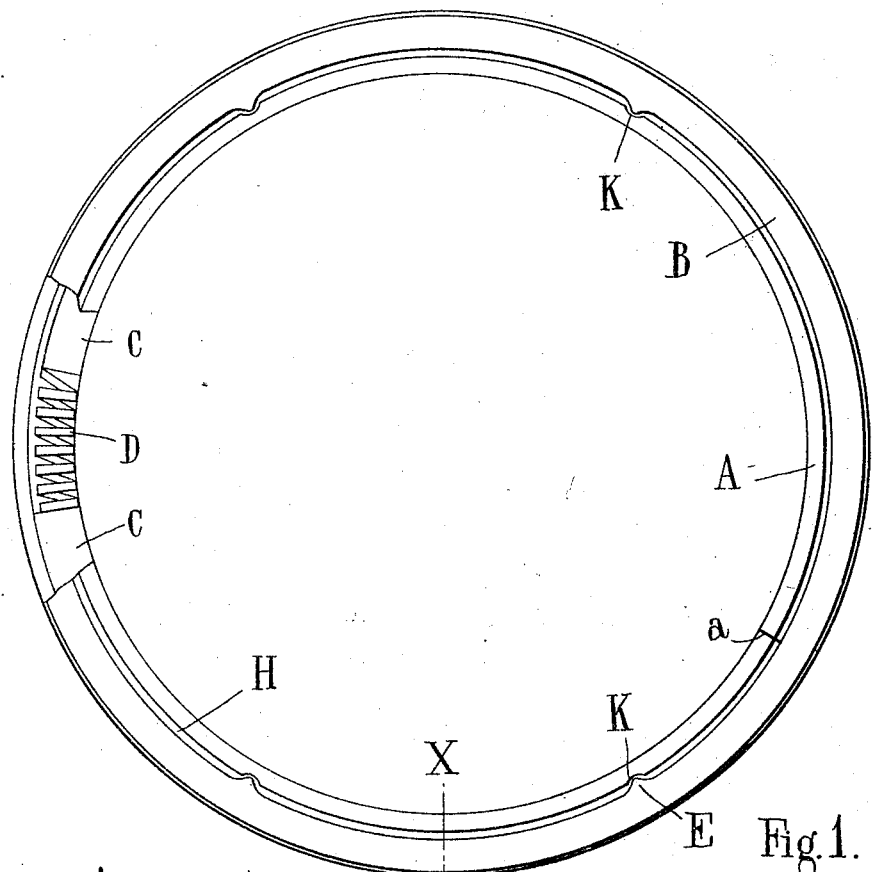
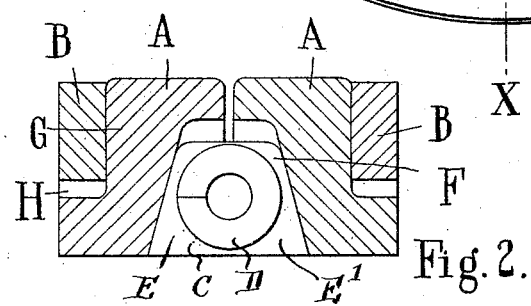
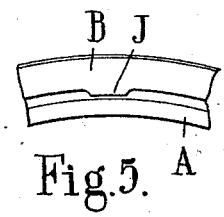
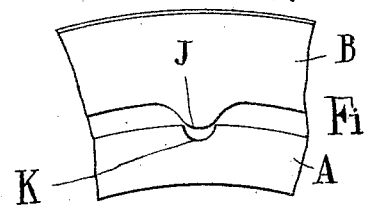
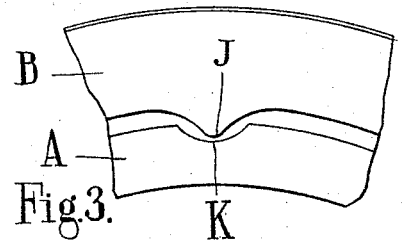
Inventors
P. Campbell
W. J. Banks
By Marko & Clerko Attys Patented May 19, 1925.

1,538,683

UNITED STATES PATENT OFFICE.

PETER CAMPBELL AND WILLIAM JAMES BANKS, OF BRISTOL, ENGLAND.

PISTON RING.

Application filed August 4, 1923. Serial No. 655,763.

*To all whom it may concern:*

Be it known that we, PETER CAMPBELL and WILLIAM JAMES BANKS, both British subjects, and both residing at Underfall Yard, Cumberland Road, Bristol, in the county of Gloucester, England, have invented certain new and useful Improvements in and Relating to Piston Rings, of which the following is a specification.

This invention relates to restraining rings as applied to piston rings of steam engines, pumps and the like.

These restraining rings are provided for the purpose of limiting the freedom of circumferential lengthening of packing rings, and usually comprise a solid annulus which engages a circumferential shoulder or recess on the packing ring, the inner bearing surface of the restraining ring being of slightly larger diameter than that of the bearing surface in the recess, when the packing ring is in position within the cylinder.

The object of the present invention is to provide such an amount of bearing surface between the restraining ring and the packing ring that the former is self-adjusting to accommodate the continual expansion of the latter.

In order that the invention may be better understood, reference will now be made to the accompanying drawings which show by way of example the application of the invention to packing rings that are forced outwardly by means of wedges and helical springs.

In the drawings:—

Figure 1 represents a plan of a packing ring to which the restraining ring is applied;

Figure 2 is a sectional view on an enlarged scale at the line X—X in Figure 1;

Figure 3 is an enlarged view at the restraining points;

Figure 4 is a view of a modified arrangement;

Figure 5 shows a further modification.

In the views, A represents two split packing rings, the gaps $a$ of which are preferably arranged at diametrically opposite positions. These rings have inner recesses E and $E^1$ that together form a chamber F within which is situated expanding springs D that bear against wedge members C, C. One of the springs D is seen in the sectional part at Figure 1.

On the outer side of each ring there is turned a recess or groove G and in this recess is located an annulus or solid restraining ring B which is machined on its periphery slightly smaller than the internal diameter of the cylinder within which the piston has to work. The inner diametrical surface of the restraining ring is so made that there is provided a clearance H with the bottom of the recess when the packing ring is in place within the cylinder.

The rings are provided with a number of small projections J which reduce the bearing surface to a minimum and extend within small recesses K (see Figures 3 and 4) formed at the bottom of the recess G in the packing rings A, leaving a small clearance therebetween, whereby fitting of the parts is facilitated.

The bearing surfaces between the restraining ring and the packing ring are reduced to a minimum as will be seen on referring to Figures 3, 4 and 5 which show three constructions.

Figure 3 shows one of several projections J formed on the inner diameter of the restraining ring. Each projection engages in a cut away part K of the recess G of the packing ring A, the projecting part being opposite to the middle part thereof.

In the modification shown in Figure 4 the projection J is slightly wider, so that it lies adjacent the two sides of the cut away part K of the packing ring.

Figure 5 shows a further modification in which the bearing surface of the packing ring A is turned circular while the inner diameter of the restraining ring B is undercut, leaving only several bearing portions, one of which is seen at J.

In all these examples the bearing portions of the restraining ring are reduced to a minimum whereby the wear that normally takes place automatically provides for the gradual expansion of the packing ring which is necessary in order to take up the wear between the packing ring and the cylinder walls to maintain the pistons pressure tight.

While the preferred constructions have been given in the foregoing description, it is clear that there are other arrangements that come within the ambit of the invention.

Having now described our invention, what we claim as new and desire to secure by Letters Patent is:—

A split packing ring for the piston of a steam engine, pump or the like having a shouldered recess in combination with a restraining ring comprising a solid annulus situated within said recess, transverse projections on the inner surface of the restraining ring that co-act with the shoulder of the recess, which projections have such a dimension that the wear automatically provides for the gradual expansion of the packing ring by means of the normal friction of the parts.

In testimony whereof we have signed our names to this specification.

PETER CAMPBELL.
WILLIAM JAMES BANKS.